United States Patent
Green

(10) Patent No.: US 11,340,415 B1
(45) Date of Patent: May 24, 2022

(54) OPTICAL COMPONENT ORGANIZING MEMBERS

(71) Applicant: II-VI DELAWARE, INC., Wilmington, DE (US)

(72) Inventor: Eric Green, Wilmington, DE (US)

(73) Assignee: II-VI DELAWARE, INC., Wilmington, DE (US)

(*) Notice: Subject to any disclaimer, the term of this patent is extended or adjusted under 35 U.S.C. 154(b) by 0 days.

(21) Appl. No.: 17/119,417

(22) Filed: Dec. 11, 2020

(51) Int. Cl.
  *G02B 6/28* (2006.01)
  *G02B 6/44* (2006.01)

(52) U.S. Cl.
  CPC .......... *G02B 6/444* (2013.01); *G02B 6/4454* (2013.01); *G02B 6/4471* (2013.01); *G02B 6/2804* (2013.01); *G02B 6/4478* (2013.01)

(58) Field of Classification Search
  CPC .... G02B 6/2804; G02B 6/444; G02B 6/4454; G02B 6/4471; G02B 6/4478
  See application file for complete search history.

(56) References Cited

U.S. PATENT DOCUMENTS

| | | | | |
|---|---|---|---|---|
| 5,469,526 A | * | 11/1995 | Rawlings | G02B 6/4246 385/135 |
| 5,515,200 A | * | 5/1996 | Delrosso | H01S 3/06704 359/341.1 |
| 5,898,812 A | * | 4/1999 | Vanoli | H01S 3/06704 385/135 |
| 6,272,276 B1 | * | 8/2001 | Potteiger | G02B 6/3897 385/134 |
| 6,741,785 B2 | * | 5/2004 | Barthel | G02B 6/4454 385/135 |
| 9,871,590 B2 | * | 1/2018 | Matsui | G02B 6/4246 |
| 10,514,515 B2 | * | 12/2019 | Lin | G02B 6/4277 |
| 10,514,518 B1 | * | 12/2019 | Livingston | G02B 6/3825 |
| 10,812,193 B2 | * | 10/2020 | Matsui | G02B 6/4246 |
| 2020/0195350 A1 | * | 6/2020 | Matsui | G02B 6/4281 |

\* cited by examiner

*Primary Examiner* — Ryan A Lepisto
(74) *Attorney, Agent, or Firm* — Blank Rome LLP

(57) ABSTRACT

In one form, an organizing member for optical components includes an elongate body extending about a hollow interior portion and including a peripheral sidewall. The organizing member also includes an optical fiber routing surface extending from the peripheral sidewall toward the hollow interior portion, and a recessed portion is positioned between the peripheral sidewall and the hollow interior portion. The recessed portion includes a number of receptacles offset from the optical fiber routing surface and corresponding in configuration to a respective optical component positionable therein.

22 Claims, 7 Drawing Sheets

OPTICAL COMPONENT ORGANIZING MEMBERS

FIELD

The present disclosure generally relates to the organization of optical components. More particularly, but not exclusively, the present disclosure relates to optical component organizing members configured to receive and organize various optical components and one or more optical fibers.

BACKGROUND

Unless otherwise indicated herein, the materials described herein are not prior art to the claims in the present application and are not admitted to be prior art by inclusion in this section.

Communication modules, including optoelectronic modules such as optical or amplifier line cards, may include various components that engage in the transmission and reception of optical signals. Some of the components may be housed within a shell of the communication module. The communication module itself may be operably received within a host device that serves as one component of a communications network, operably coupled to one or more fiber optic cables which include one or more optical fibers, or both. The communication module may include a transmit port, a receive port, or both, each of which is configured to receive a connector of the optical fiber.

Some communication modules, such as optical or amplifier line cards, may include a large number of optical components which may need to be individually positioned relative to one another and other components during assembly of the module. Amongst other things, positioning of these components may be challenging and time consuming, and the positioning of optical fibers relative to these components may also be difficult. As a result, assembly of optoelectronic modules of this nature may become complicated and require stocking a large volume of individual optical components having different functionalities. These modules may also require a larger number of optical fiber splices between optical components of sequential functions, and these splices may result in increased manufacturing costs and potentially lead to decreased reliability or increased loss. Thus, there remains a need for additional contributions in this technology.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one example embodiment, an organizing member for optical components includes an elongate body extending about a hollow interior portion and including a peripheral sidewall. The organizing member also includes an optical fiber routing surface extending from the peripheral sidewall toward the hollow interior portion and a recessed portion positioned between the peripheral sidewall and the hollow interior portion. The recessed portion includes a number of receptacles offset from the optical fiber routing surface and corresponding in configuration to a respective optical component positionable therein.

In another example embodiment, an organizing member for an optoelectronic module includes an elongate body including an interior sidewall. An open interior portion is positioned on a first side of the interior sidewall and is at least partially surrounded by the interior sidewall. The organizing member also includes an optical fiber routing pathway positioned on an opposite, second side of the interior sidewall relative to the open interior portion. A cavity is formed in the optical fiber routing pathway and includes a mounting surface which is recessed relative to the optical fiber routing pathway. The mounting surface includes a number of receptacles corresponding in configuration to a respective optical component positionable therein and a first elongate slot extends through the mounting surface adjacent to a first one of the receptacles.

In yet another example embodiment, a method includes providing an organizing member which includes an elongate body having an open interior portion; an optical fiber routing pathway extending around the open interior portion; a cavity formed in the optical fiber routing pathway and including a mounting surface which is recessed relative to the optical fiber routing pathway. The mounting surface includes a number of receptacles structured to receive an optical component and a first elongate slot extends through the mounting surface adjacent to a first one of the receptacles. The method also includes positioning a first optical component having an electrical lead in a first one of the receptacles with the electrical lead extending through the first slot, and electrically coupling a flexible circuit with the electrical lead.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to the organization of optical components. More particularly, but not exclusively, the present disclosure relates to optical component organizing members configured to receive and organize various optical components and one or more optical fibers. Although various embodiments are described in the context of optical components which may be used in the field of optical networking, the embodiments disclosed herein may be employed in other fields or operating environments where the functionality disclosed herein may be useful. Accordingly, the scope of the invention should not be construed to be limited to the example implementations and operating environments disclosed herein.

Figure 1:
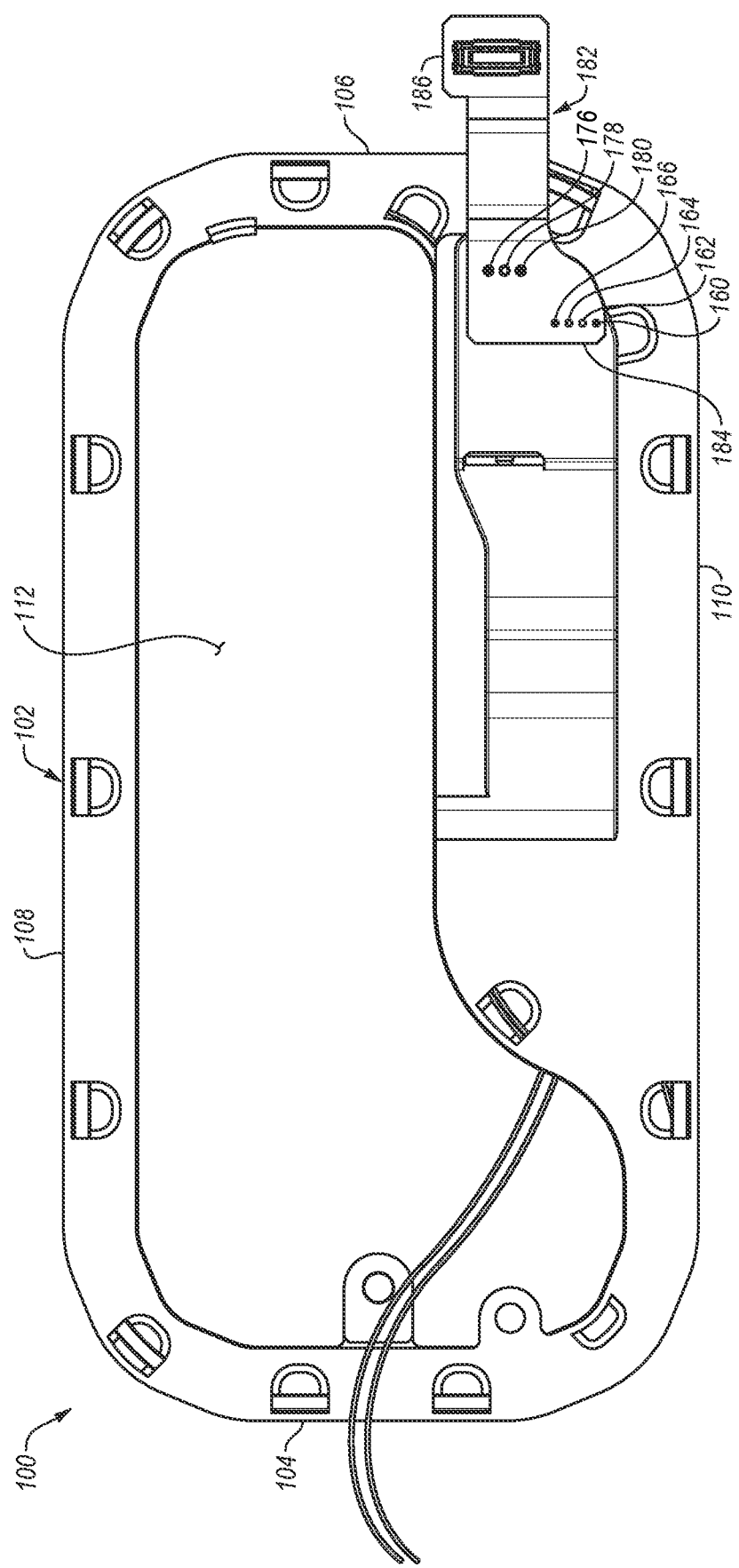
FIG. 1 is a plan view of an optical component organizing member.
Figure 2:
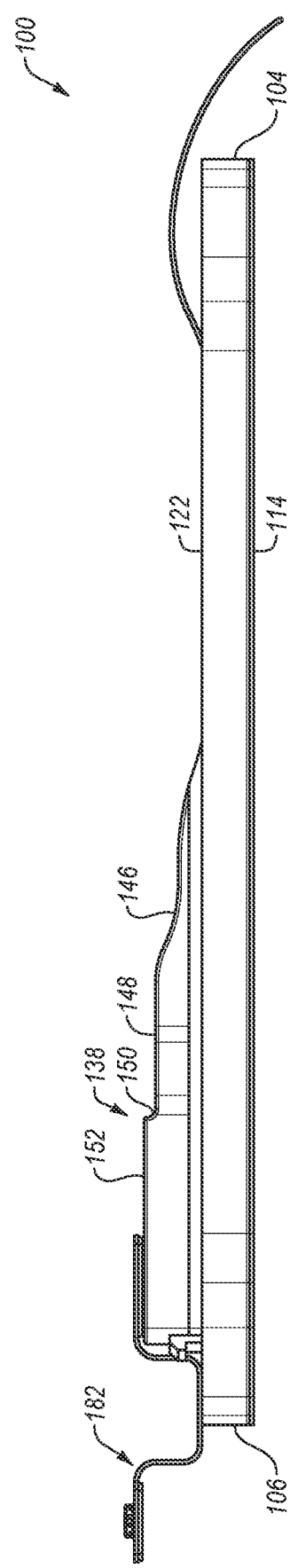
FIG. 2 is a side view of the organizing member of FIG. 1.
Figure 3:
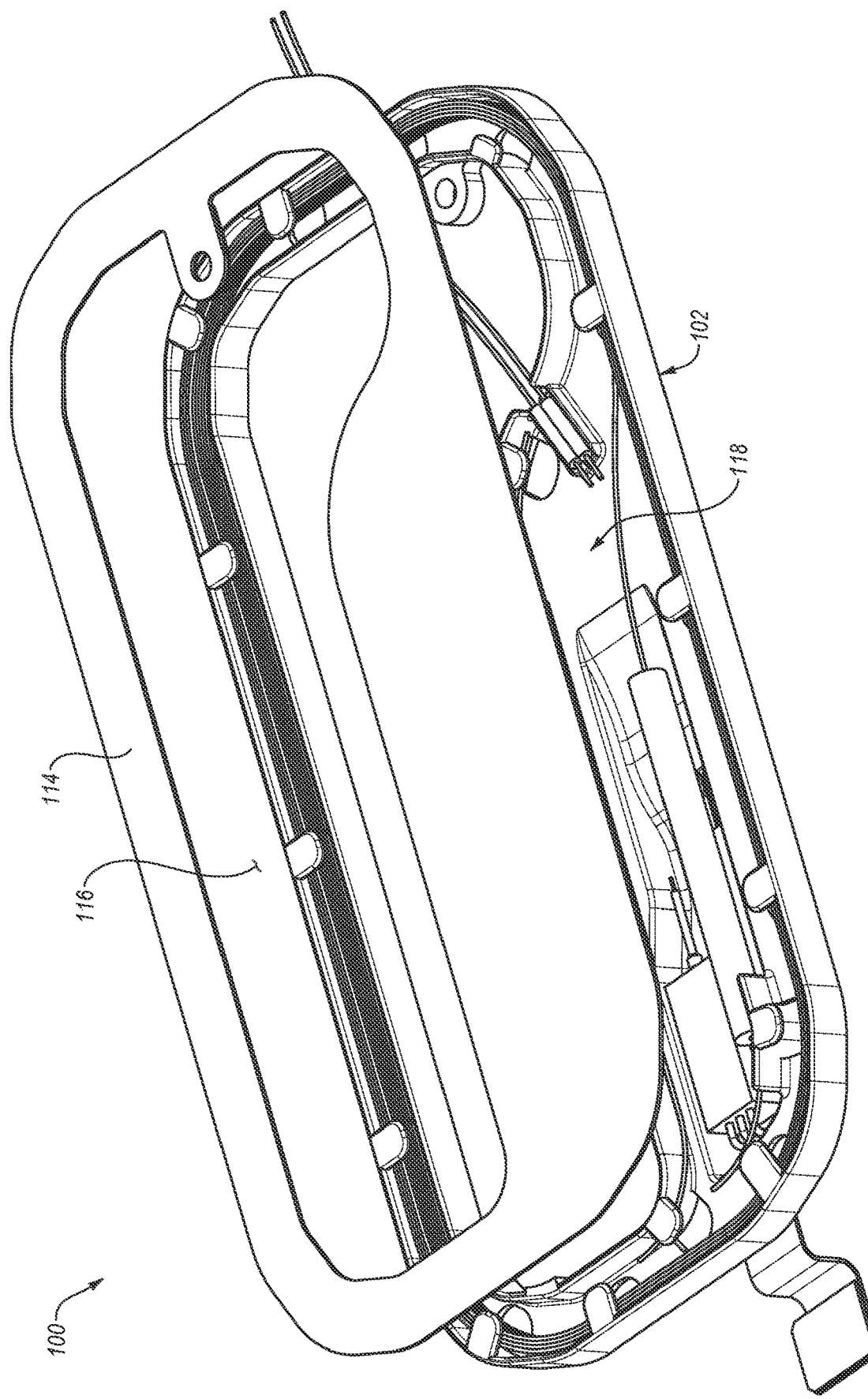
FIG. 3 is a perspective, partially exploded view of the organizing member of FIG. 1.
Figure 4:
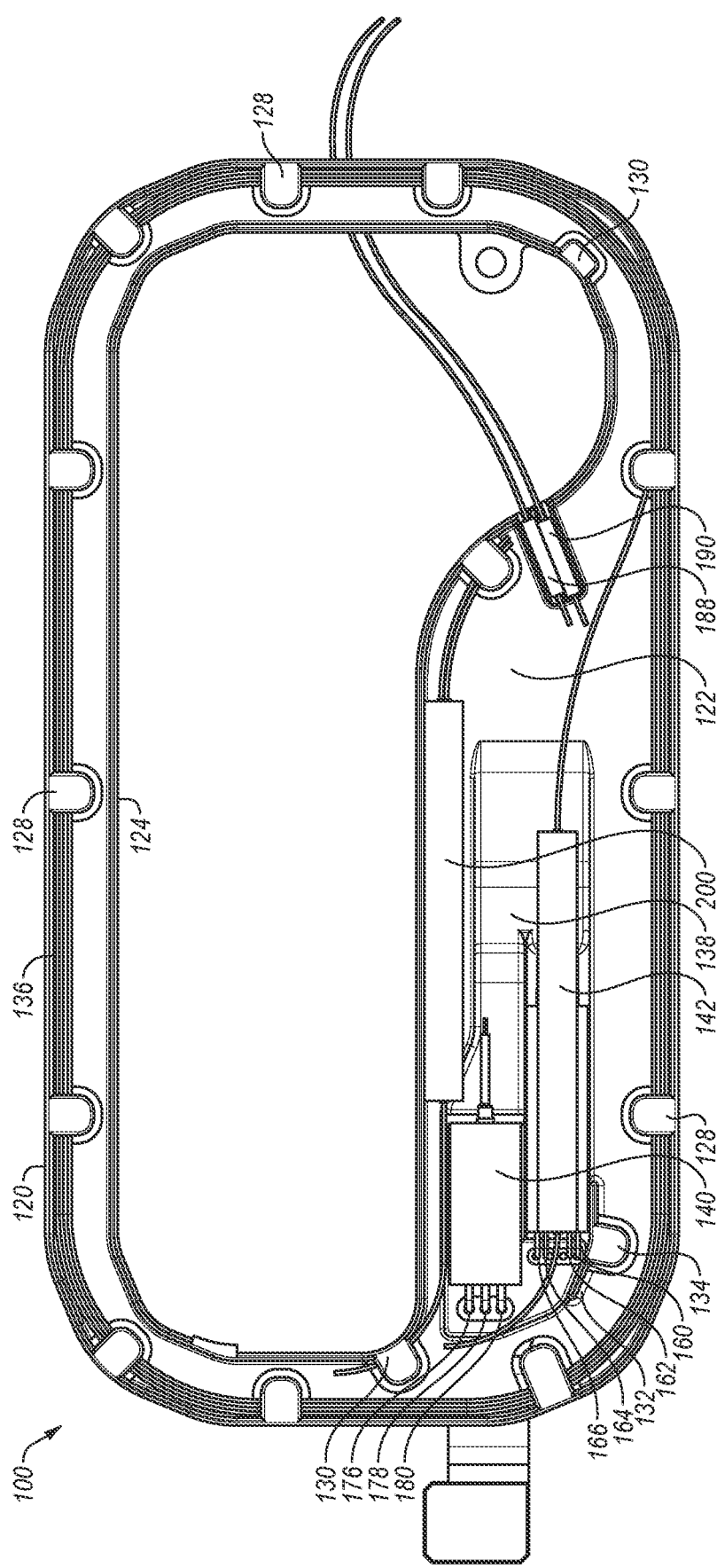
FIG. 4 is a bottom view of the organizing member of FIG. 1 with a cover removed.
Figure 5:
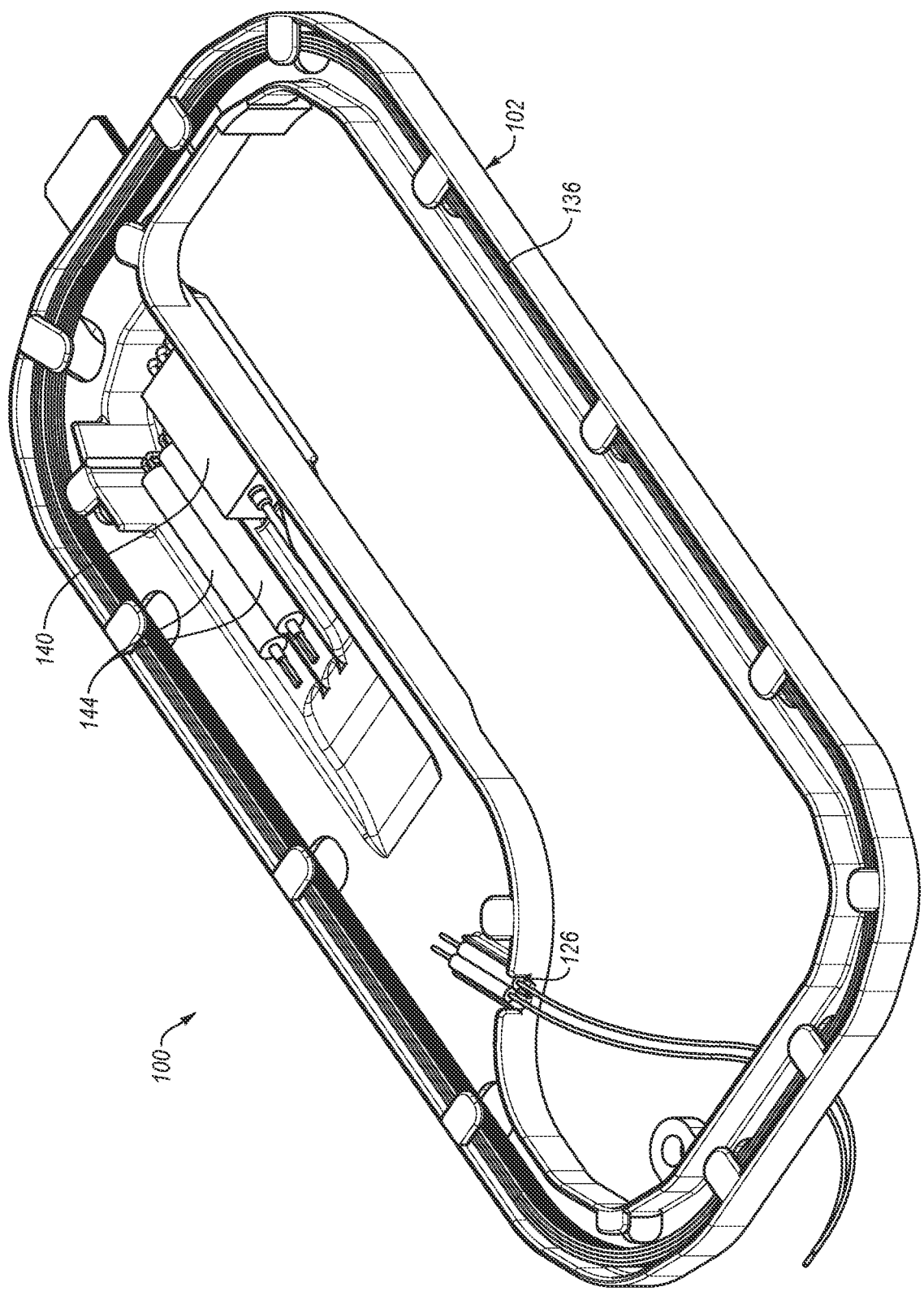
FIG. 5 is a perspective view of the organizing member of FIG. 1 with a cover removed therefrom.
Figure 6:
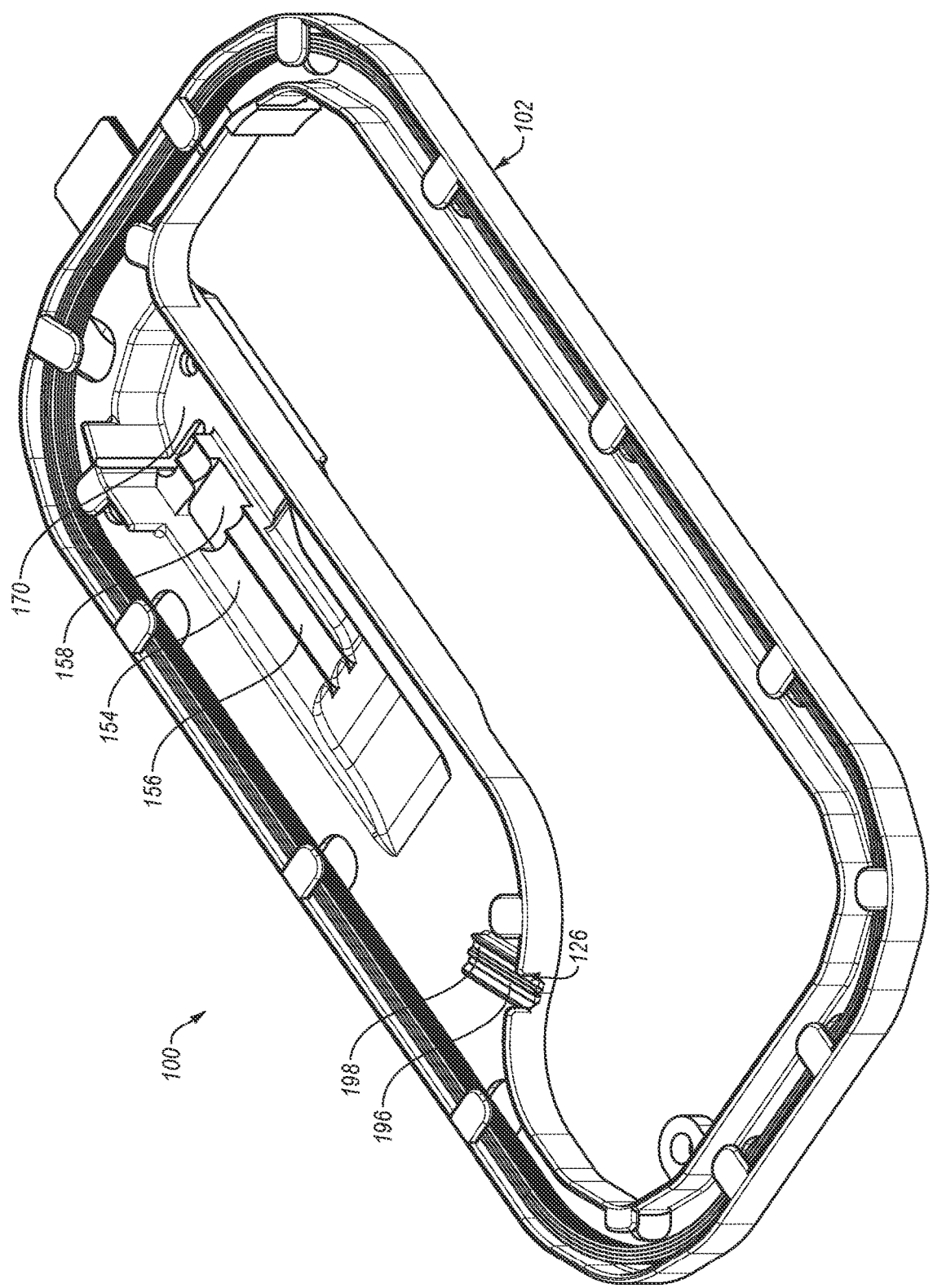
FIG. 6 is a perspective view of the organizing member of FIG. 1 with a cover and various components removed therefrom.
Figure 7:
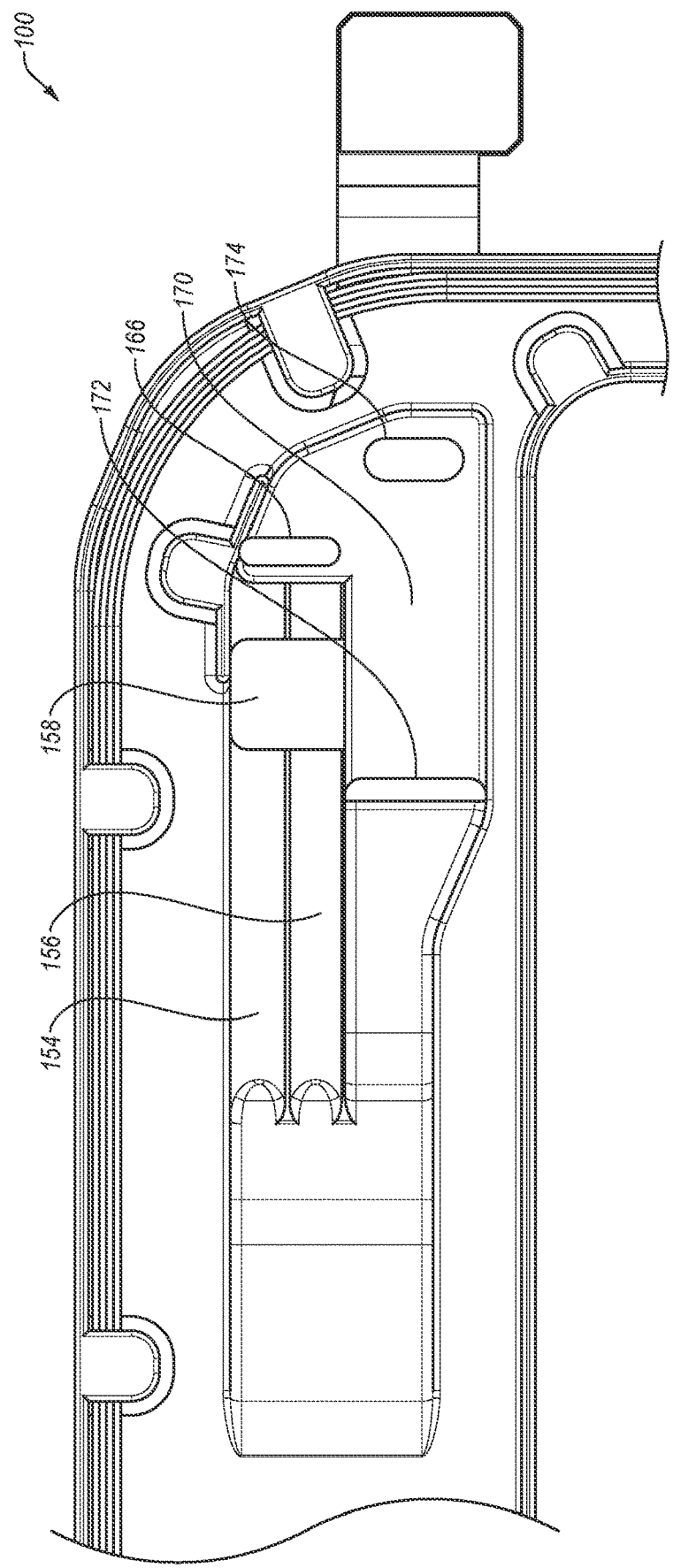
FIG. 7 is an enlarged view of a portion of the organizing member of FIG. 1.

With general reference to FIGS. 1-7 for example, there is illustrated an example embodiment of an optical component organizing member 100. The organizing member 100 includes a body 102 which extends between a first end 104 and a second end 106 which is positioned opposite of the first end 104. The body 102 also includes a first side 108 and a second side 110 which is positioned opposite of the first side 108. The first side 108 and the second side 110 extend between the first end 104 and the second end 106. In the illustrated configuration, the first end 104, the second end 106, the first side 108 and the second side 110 cooperate such that the body 102 is generally of a rectangular shape having rounded corners between the first and second ends 104, 106 and the first and second sides 108, 110. However, alternative shapes and configurations for the body 102 are possible.

The body 102 extends about a hollow interior 112 which extends between and opens through the organizing member 100. A portion of the second side 110 of the body 102 includes a width which is greater than the width of the first side 108 of the body 102 such that the hollow interior 112 includes an asymmetric configuration. More specifically, in the illustrated configuration, the hollow interior 112 generally includes a boot or L-shaped configuration, although other variations are possible. In some forms, the hollow interior 112 may be occupied by other elements or components, including for example those that are optical, electrical, thermal or structural in nature, of the assembly or module in which the organizing member 100 may be included.

The organizing member 100 also includes a cover 114 which may be engageable with or affixed to the body 102. For example, the cover 114 may be affixed to the body 102 utilizing one or more adhesives. Additionally or alternatively, the body 102, the cover 114, or both may include one or more features which interact with one another to facilitate engagement between the body 102 and the cover 114. For example, the cover 114 may include one or more tabs which interact with one or more receptacles of the body 102 to facilitate engagement therebetween. The cover 114 includes an opening 116 which may include a configuration that corresponds to the configuration of the hollow interior 112 such that the hollow interior 112 extends through the body 102 and the cover 114.

When engaged with or affixed to the body 102, the cover 114 and the body 102 cooperate to provide a chamber 118 which is configured to house a number of items including, for example, one or more optical components and one or more optical fibers. The body 102 includes an outer sidewall 120 which extends about the periphery of the body 102. In the illustrated form, the outer sidewall 120 is continuous, although forms in which one or more openings are provided in the outer sidewall 120 are possible. The body 102 also includes a surface 122 from which the outer sidewall 120 extends. The surface 122 extends from the outer sidewall 120 toward the hollow interior 112 and may, for example, be configured as a pathway for routing one or more optical fibers in the body 102. An interior sidewall 124 also extends from the surface 122 and extends around the hollow interior 112. In the illustrated form, the interior sidewall 124 includes a notch or opening 126 (FIG. 5), although forms in which the interior sidewall 124 is continuous or includes one or more additional openings the same as or similar to the opening 126 are possible.

The outer sidewall 120 includes a number of tabs 128, only a few of which have been identified to preserve clarity, extending over the surface 122 and toward the interior sidewall 124. Similarly, the interior sidewall 124 includes a number of tabs 130, only a few of which have been identified to preserve clarity, extending over the surface 122 and toward the outer sidewall 120. An intermediate guide member 132 is positioned between the outer sidewall 120 and the interior sidewall 124 and includes a tab 134 which extends toward the outer sidewall 120. The outer sidewall 120, interior sidewall 124 and the intermediate guide member 132 are configured for arranging positioning of optical fibers of a fiber coil 136 in the body 102 and relative to other items or components which may be present therein. In addition, the tabs 128, 130, and 134 cooperate to assist in retaining the positioning of the optical fibers of the fiber coil 136 in the body 102.

The body 102 further includes a cavity or recessed portion 138 in which a number of optical components may be positioned. For example, in the illustrated form, the recessed portion includes a pump laser 140, a gain flattening filter 142, and a pair of photodiode taps 144 (FIG. 5), although variations in the size, structure, and function(s) of the components positioned in the recessed portion 138 may vary. The recessed portion 138 is formed in or offset relative to the surface 122. As may be seen in FIG. 2 for example, the recessed portion 138 includes a curvilinear portion 146 which extends from the surface 122 to a generally linear portion 148. A step 150 is positioned between the generally linear portion 148 and another generally linear portion 152. In this configuration, the portions 148 and 152 are positioned in different planes relative to the surface 122, although other variations in the configuration of the recessed portion 138 are possible. The portions 148 and 152 may, individually or collectively, define a mounting surface on which one or more components or receptacles for components may be formed or positioned. In the illustrated form, the recessed portion 138 is positioned between the outer sidewall 120 and the interior sidewall 124 with a portion of the surface 122 being positioned between the recessed portion 138 and the outer sidewall 120 and a portion of the surface 122 being positioned between the recessed portion 138 and the interior sidewall 124.

The recessed portion 138 includes receptacles 154 and 156 which may generally correspond in configuration to optical components positionable therein and may be formed by or positioned on the portions 148 and 152 of the recessed portion 138. For example, in the illustrated form where each of the photodiode taps 144 includes an elongate cylindrical configuration, the receptacles 154 and 156 may be similarly configured and include an elongate concave surface into which the photodiode taps 144 or other components may be positioned. In one form, the surface of the receptacles 154 and 156 on which the photodiode taps 144 are positioned may be U-shaped or V-shaped, although other configurations are possible.

The photodiode taps 144 or other components may be secured in or affixed to the receptacles 154 and 156 by a pressure sensitive adhesive; however, other variations are possible. A gap 158 is positioned between opposite sections of the receptacles 154 and 156 and may, for example, provide a section of relief for a portion of the photodiode taps 144 or other components positioned in the receptacles 154 and 156 where stress should not be applied. For example, an adhesive may be applied to the sections of the receptacles 154 and 156 positioned on opposite sides of the gap 158, while the gap 158 remains free of adhesive when the photodiode taps 144 are positioned in the receptacles 154 and 156.

A pair of connectors or pins 160 and 162 extends from a first one of the photodiode taps 144 and a pair of connectors or pins 164 and 166 extends from a second one of the photodiode taps 144. The pins 160, 162, 164 and 166 may be, for example, electrical connectors or leads extending from the photodiode taps 144. A slot 168 is provided in the portion 152 of the recessed portion 138 and adjacent to an end of the receptacles 154 and 156. The pins 160, 162, 164 and 166 may extend from the photodiode taps 144 and through the slot 168 such that they are accessible from the exterior of the organizing member 100.

The recessed portion 138 also includes a receptacle 170 configured to receive the pump laser 140 and positioned between the receptacles 154 and 156 and the hollow interior 112. More specifically, in the illustrated form, the pump laser 140 generally includes a rectangular configuration and the receptacle 170 may include a similar configuration. In one form, the pump laser 140 may be positioned in the receptacle 170 and retained therein by an adhesive, such as a pressure sensitive adhesive, positioned between the pump laser 140 and the portion 152 of the recessed portion 138. A slot 172 is positioned at the step 150 between the portions 148 and 152 of the recessed portion 138 and a portion of the pump laser 140 may be positioned in the slot 172 to facilitate placement of the pump laser 140 in the receptacle 170. The receptacle 170 also includes a slot 174. A number of connectors or pins 176, 178, and 180 extend from the pump laser 140 and through the slot 168 such that they are accessible from the exterior of the organizing member 100. The pins 176, 178, and 180 may be, for example, electrical connectors or leads extending from the pump laser 140.

The organizing member 100 further includes a flex circuit 182 which may be coupled with the pins 160, 162, 164, 166, 176, 178 and 180. The flex circuit 182 may include, for example, a pressure sensitive adhesive pad which secures an end 184 of the flex circuit 182 to the body 102 of the organizing member 100 when the flex circuit 182 is engaged with the pins 160, 162, 164, 166, 176, 178 and 180. The flex circuit 182 may also include an electrical connector 186 opposite of the end 184 which may be configured to engage with a corresponding connector in a larger optical or opto-electronic module or component such as an optical amplifier line card. One or both of the 184 and the electrical connector 186 may include localized stiffeners.

When the photodiode taps 144 and the pump laser 140 are positioned in the recessed portion 138, these components are generally positioned below the surface 122 or, alternatively stated, do not extend into a plane of the surface 122. The gain flattening filter 142 may be positioned on and between the photodiodes taps 144 such that at least a portion thereof is positioned below the surface 122 or otherwise does not extend into the plane of the surface 122. The positioning of the gain flattening filter 142 or other component similarly location may be secured with a pressure sensitive adhesive, although other variations are possible. A number of optical fibers may extend from one or more of the components positioned in the recessed portion 138 and be included in the fiber coil 136.

The organizing member 100 also includes a pair of components 188 and 190 which are positioned adjacent to the opening 126 in the interior sidewall 124. In one form, the components 188 and 190 may be, for example, soft tubes such as furcation tubing which provide support and strain relief to input and output fibers associated with the organizing member 100. In some forms, a portion of one or both of the components 188 and 190 may extend through the opening 126. A pair of optical fibers 192 and 194 respectively extend from the components 188 and 190 and may be coupled to one or more other optical components in a module or device in which the organizing member 100 is included. The components 188 and 190 are respectively positioned in receptacles 196 and 198 which are positioned on the surface 122. The receptacles 196 and 198 generally include a concave configuration structured to correspondingly receive the components 188 and 190 which, in the illustrated form, include a cylindrical configuration. In one form, the surface of the receptacles 196 and 198 on which the components 188 and 190 are positioned may be U-shaped or V-shaped, although other configurations are possible. The shape or configuration of one or both of the receptacles 196 and 198 may change and the shape or configuration of one or both of the components 188 and 190 changes. While note shown, one or more optical fibers may extend from one or both of the components 188 and 190 and be included in the fiber coil 136 or otherwise coupled to one or more other components included in the organizing member 100.

The organizing member 100 also includes a wavelength division multiplexer 200 which is positioned on the surface 122 and may be secured thereto with a pressure sensitive adhesive. A number of optical fibers may extend from the wavelength division multiplexer 200 and be included in the fiber coil 136 or otherwise coupled to one or more other components included in the organizing member 100.

While not previously discussed, it should be understood that the surface 122 and the space between the outer sidewall 120 and the interior sidewall 124 allows vertical positioning of the optical fibers of the fiber coil 136 on top of one another from the surface 122 to the underside of tabs 128, 130 and 134. Amongst other things, this configuration allows the optical fibers to be routed in an arrangement that is more conducive to the natural properties of the optical fibers. For example, the illustrated arrangement provides a larger and more consistent bend radius of the optical fibers relative to forms where, for example, the optical fibers are more generally positioned laterally or side by side to one another between the sidewalls 120 and 124. The illustrated arrangement may also provide conditions which are more suitable for sequential splicing operations.

During operation, one or more of the components in the organizing member 100 may produce heat, and the functionality of some of these components may be adversely affected when subjected to increased temperature. Additionally or alternatively, a component or module in or on which the organizing member 100 is positioned may also produce heat during operation. To control the temperature inside the organizing member 100 and avoid heat related impact to components therein, and also optionally to remove heat from the component or module in or on which the organizing member 100 is positioned, the body 102 of the organizing member 100 may be formed of a thermally conductive material such that the body 102 may transfer heat from its interior to, for example, the ambient atmosphere in which it is used. In doing so, the operating temperature range of various components may be reduced, and decreased performance may be avoided. The cover 114 may be formed of an electrically insulative or dielectric material, such as a polymer. In this form, the organizing member 100 may be mounted or positioned on another component with the cover 114 facing and contacting the other component and in close proximity to electrical or electronic components with the risk of electrical shorting due to the presence of the organizing member 100 being reduced or eliminated.

In one form for example, the body 102 or the cover 114 may be formed through the extrusion of a plastic/polymeric material or a metallic material. Depending on intended use, the body 102 or the cover 114 may exhibit electrically or thermally insulative properties, electrically or thermally conductive properties, or have discrete portions each exhibiting electrically or thermally insulative properties or electrically or thermally conductive properties. By way of example, when electrically or thermally insulative properties are desired, the body 102 or the cover 114 may be formed of a plastic/polymeric material, and when electrically or thermally conductive properties are desired, the body 102 or the cover 114 may be formed of a metallic material. In some forms, depending on use, the adhesives used for securing positioning of components in the organizing member 100 may be thermally or electrically conductive, or they may be thermally or electrically insulative. In one aspect, the adhesives used for securing positioning of components in the organizing member 100 are thermally conductive and facilitate transfer of heat from the component to the body 102 of the organizing member 100 which may function as heatsink or radiator which releases heat absorbed from the components in the organizing member 100 to the ambient atmosphere in which the organizing member 100 is used. As suggested above, the organizing member 100 may also serve as a heatsink, radiator or thermal conduit for a device component, such as a semiconductor package, on which it is mounted. In these forms, the organizing member 100 may be secured to the device or component with a thermally conductive adhesive which facilitates transfer of heat from the external device component to the body 102 of the organizing member 100. In some forms, one or both of the body 102 and the cover 114 may be formed by an insert-molding process and include discrete portions of different materials that have conductive or insulative properties.

The optical components described herein which may be received by and positioned in the organizing member 100 may be provided in a number of different forms and with a number of different functionalities. In some aspects, optical components may be present which perform a single function or multiple functions, or there may be single and multiple function optical components present. In one aspect, one or more of the optical components received by and positioned in the organizing member 100 may be fusion spliced fiber optical components. In some aspects, one or more of the optical components received by and positioned in the organizing member 100 generate heat during operation. In addition to or as an alternative to the components already specifically identified herein, particular forms of the optical components which may be received by and positioned in the organizing member 100 include isolators, splitters, tap couplers, wavelength division multiplexers, gain flattening filters, combination isolators and wavelength division multiplexers, and combination isolators and gain flattening filters, just to provide a few examples.

In one aspect, the optical components which may be received by and positioned in the organizing member 100 may include fused-fiber devices housed in a cylindrical housing or packaging. In these components, bare fibers are epoxied into slotted glass rods which are further protected by a concentric layer of shrink tubing, and then covered by an outer concentric metal or glass tube to provide a reliable device that can withstand environmental conditions such as vibration and high humidity/high temperature exposure. The optical components which may be received by and positioned in the organizing member 100 may also include hybrid (i.e., multi-function) free-space components in which the optical signal from an incoming fiber is expanded with a collimating lens and then passed through two or more sections that produce desirable optical effects (such as isolation, beamsplitting or filtering) and then directed into an output fiber using a similar collimating lens. Hybrid free-space components of this nature may also be housed in a cylindrical housing or packaging.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An organizing member for optical components, comprising:
    an elongate body extending about a hollow interior portion and including a peripheral sidewall; and
    an optical fiber routing surface of the elongated body extending in a plane from the peripheral sidewall toward the hollow interior portion;
    wherein the optical fiber routing surface has a recessed portion positioned between the peripheral sidewall and the hollow interior portion; and
    wherein the recessed portion of the optical fiber routing surface includes a number of receptacles offset from the plane of the optical fiber routing surface and corresponding in configuration to a respective optical component positionable therein.

2. The organizing member of claim 1, further comprising a cover engageable with the elongate body in an arrangement at least partially enclosing one or both of the optical fiber routing surface and the recessed portion.

3. The organizing member of claim 2, wherein the cover is at least partially formed of an electrically or thermally insulative material.

4. The organizing member of claim 1, wherein at least a portion of the optical fiber routing surface is positioned between the recessed portion and the peripheral sidewall.

5. The organizing member of claim 1, wherein the organizing member further includes an interior sidewall spaced from the peripheral sidewall and extending around the hollow interior portion.

6. The organizing member of claim 5, wherein the optical fiber routing surface extends between the peripheral sidewall and the interior sidewall.

7. The organizing member of claim 5, wherein each of the peripheral sidewall and the interior sidewall includes a plurality of tabs overhanging the optical fiber routing surface.

8. The organizing member of claim 5, wherein the interior sidewall includes a notch extending therethrough, and the optical fiber routing surface includes a receptacle structured to receive an optical component extending through the notch.

9. The organizing member of claim 1, wherein a first receptacle of the number of receptacles includes an elongate concave surface structured to receive an optical component having an elongate cylindrical configuration.

10. The organizing member of claim 9, wherein the elongate concave surface includes a first portion spaced from a second portion.

11. The organizing member of claim 9, wherein a second receptacle of the number of receptacles is offset from the first receptacle in a direction away from the optical fiber routing surface and is configured to receive an optical component having a rectangular configuration.

12. An organizing member for an optoelectronic module, comprising:
    an elongate body including an interior sidewall;
    an open interior portion of the elongate body positioned on a first side of the interior sidewall and at least partially surrounded by the interior sidewall;
    an optical fiber routing pathway surface of the elongate body extending in a plane from an opposite, second side of the interior sidewall relative to the open interior portion; and
    a cavity recess formed in the optical fiber routing pathway surface and including a mounting surface which is recessed relative to the plane the optical fiber routing pathway surface;
    wherein the mounting surface includes a number of receptacles each corresponding in configuration to a respective optical component positionable therein; and
    wherein the mounting surface defines a first elongate slot extending through the mounting surface adjacent to a first one of the receptacles, the first elongate slot being configured to pass a connector through the mounting surface.

13. The organizing member of claim 12, further comprising a first optical component positioned in the first receptacle and including a connector extending therefrom and through the first elongate slot.

14. The organizing member of claim 13, wherein a second elongate slot extends through the mounting surface adjacent to a second one of the receptacles.

15. The organizing member of claim 14, further comprising a second optical component positioned in the second receptacle and including a connector extending therefrom and through the second elongate slot.

16. The organizing member of claim 15, further comprising a flexible circuit electrically coupled with the connectors extending from the first and second optical components.

17. The organizing member of claim 15, further comprising a dielectric cover positioned over and enclosing the cavity and the optical fiber routing pathway surface.

18. An organizing member for optical components, comprising:
    an elongate body extending about a hollow interior portion and including a peripheral sidewall;
    an interior sidewall spaced from the peripheral sidewall and extending around the hollow interior portion, wherein the interior sidewall includes a notch extending therethrough;
    an optical fiber routing surface extending from the peripheral sidewall toward the hollow interior portion, wherein the optical fiber routing surface includes a receptacle structured to receive an optical component extending through the notch; and
    a recessed portion positioned between the peripheral sidewall and the hollow interior portion;
    wherein the recessed portion includes a number of receptacles offset from the optical fiber routing surface and corresponding in configuration to a respective optical component positionable therein.

19. The organizing member of claim 18, further comprising a cover engageable with the elongate body in an arrangement at least partially enclosing one or both of the optical fiber routing surface and the recessed portion.

20. The organizing member of claim 18, wherein each of the peripheral sidewall and the interior sidewall includes a plurality of tabs overhanging the optical fiber routing surface.

21. The organizing member of claim 18, wherein a first receptacle of the number of receptacles includes an elongate concave surface structured to receive an optical component having an elongate cylindrical configuration.

22. The organizing member of claim 21, wherein a second receptacle of the number of receptacles is offset from the first receptacle in a direction away from the optical fiber routing surface and is configured to receive an optical component having a rectangular configuration.

* * * * *